Patented Oct. 28, 1947

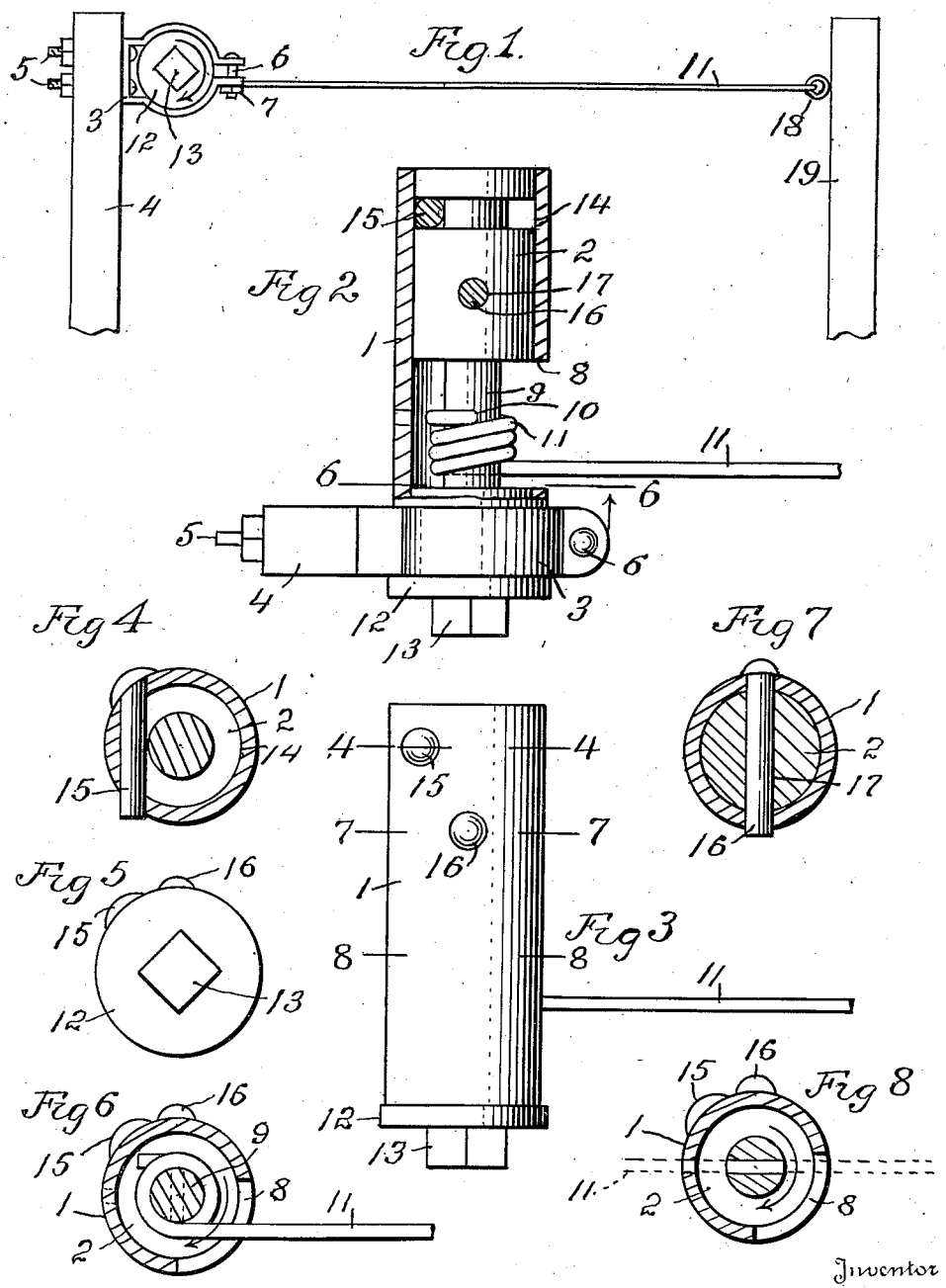

2,429,590

UNITED STATES PATENT OFFICE 2,429,590

LINE SUPPORTER AND TIGHTENER

William H. Ames, Jackson County, Mo.

Application April 3, 1946, Serial No. 659,310

2 Claims. (Cl. 211—119.15)

My invention relates to improvements in line supports and tighteners. It is adapted for supporting and tightening a clothes line between two stationary supports.

The object of my invention is to provide a novel line support and tightener of the kind described, which is simple, cheap to make and install in operative position, which is strong, durable, not likely to get out of order, and which is efficient in its operation.

The novel features of my invention are hereinafter fully described and claimed.

In the accompanying drawings, which illustrate the preferred embodiment of my invention, Fig. 1 is a reduced side elevation of my improved support and tightener, shown mounted on a post in its operative position, with one end of the supported line attached to a distant post.

Fig. 2 is a top view of the sleeve supporting means, and showing the sleeve mounted therein partly in plan and partly in horizontal longitudinal section, the reel being shown in plan and having wound thereon a portion of the line to be supported.

Fig. 3 is a plan view of the sleeve and a part of the reel, with the line extending therefrom.

Fig. 4 is a section on the line 4—4 of Fig. 3.

Fig. 5 is an end view of the reel.

Fig. 6 is a section on the line 6—6 of Fig. 2.

Fig. 7 is a section on the line 7—7 of Fig. 3.

Fig. 8 is a section on the line 8—8 of Fig. 3, the line being shown in dotted lines extended through the hole and notch alined with each other in the sleeve.

Similar characters of reference designate similar parts in the different views.

My improved line support and tightener is provided with a horizontal cylindrical sleeve 1 having a cylindrical reel 2 rotatably mounted therein, both, preferably, being of metal.

For supporting the sleeve 1 in a stationary position, one end portion thereof is held clamped tightly between the upper and lower arms of a U-shaped clamp 3, Figs. 1 and 2, the middle portion of said clamp being fastened to one side of a post 4 by two bolts 5. A bolt 6 extending through the arms of the clamp 3 and having a nut 7, Fig. 1, holds the arms against the upper and lower sides of the sleeve 1.

The sleeve 1 has a peripheral rectangular notch 8 which extends from above the horizontal longitudinal central plane of the sleeve downwardly to the central longitudinal vertical plane of the sleeve, as shown in Figs. 2, 6 and 8.

Registering with the notch 8, the reel 2 has a longitudinal central cylindrical portion 9 of reduced diameter, having transversely through it a hole 10 adapted to receive therethrough the line 11 to be supported and tightened. One end of the reel has a cylindrical portion, designated by 12, of larger diameter than the remainder of the reel, which portion bears against the adjacent end of the sleeve 1. The outer end of the portion 12 is provided with a projecting squared portion 13 adapted to be gripped, as by a wrench, not shown, by which the reel 2 is rotated to wind on its reduced portion 9 the line 11, as shown in Figs. 2 and 6.

For holding the reel 2 from endwise movement in the sleeve 1, one end portion of the reel is provided with an annular groove 14 through which is removably fitted a pin 15 extending through two alined holes on the sleeve 1.

Releasably locking the reel 2 in the sleeve 1, after the line 11 has been tightened, a pin 16 is extended through two alined holes in opposite sides of the sleeve 1 and through a transverse hole 17, Figs. 2 and 7, in the reel 2.

The free end of the line 11 is attached to a screw eye 18 mounted in a distant post 19, Fig. 1.

In operation, the parts having been assembled as has been described, one end of the line 11 is fastened to the screw eye 18 and the reel is then rotated in the direction indicated by the arrows, Figs. 1 and 6, winding the line 11 on the portion 9 of reduced diameter, as shown in Figs. 2 and 6.

When the line 11 has been tightened, the reel 2 is turned further to permit the insertion of the pin 16 through the hole 17 in the reel 2 and through the alined holes in the sleeve 1, as shown in Figs. 2 and 7, thus locking the reel from rotation.

My invention is subject to many modifications, within the scope of the appended claims, without departing from the spirit thereof.

What I claim is:

1. In a line support and tightener, in combination with a horizontal cylindrical sleeve having in one side a peripheral rectangular notch extending from above its central horizontal plane downwardly to its central longitudinal vertical plane and adapted to receive therethrough the line to be tightened, of a reel rotatably mounted on a central longitudinal horizontal axis in said sleeve and having a longitudinal cylindrical portion of reduced diameter alining with said notch, said reduced portion having a transverse hole adapted to have passed through it the line which is adapted to be wound on said reduced cylindrical portion, said reel having means for being rotated on its axis, means for stationarily supporting said sleeve in a horizontal transverse position, means for rotating said reel without longitudinal movement in said sleeve, and releasable means for locking said reel in said sleeve in an adjusted position.

2. In a line support and tightener, in combination with a horizontal cylindrical sleeve having in one side a peripheral rectangular notch extending from above its central horizontal plane downwardly to its central longitudinal vertical plane and adapted to receive therethrough the line to be tightened, of a reel rotatably mounted on a central longitudinal horizontal axis in said sleeve and having a longitudinal cylindrical portion of reduced diameter alining with said notch, said reduced portion having a transverse hole adapted to have passed through it the line which is adapted to be wound on said reduced cylindrical portion, said reel having means for being rotated on its axis, means for stationarily supporting said sleeve in a horizontal transverse position, said reel having an annular peripheral groove adjacent one end, said sleeve having a hole alining with said groove, a pin releasably extending through said last named hole into said groove to hold said reel from longitudinal movement, means to rotate said reel on its axis, a hole extending transversely through said reel, a second hole through said sleeve in register with said last named hole, and a locking pin releasably extending through said last named registering holes for locking said sleeve from rotation.

WILLIAM H. AMES.

REFERENCES CITED

The following references are of record in the file of this patent:

UNITED STATES PATENTS

| Number | Name | Date |
|---|---|---|
| 532,811 | Norton | Jan. 22, 1895 |
| 570,090 | Haley | Oct. 27, 1896 |
| 1,077,716 | Isitt | Nov. 4, 1913 |
| 1,261,666 | Wingert | Apr. 2, 1918 |